United States Patent
Himberg et al.

(10) Patent No.: US 7,170,428 B2
(45) Date of Patent: Jan. 30, 2007

(54) ELECTRONIC DEVICE AND METHOD OF MANAGING ITS KEYBOARD

(75) Inventors: Johan Himberg, Helsinki (FI); Jani Mäntyjärvi, Oulu (FI); Jonna Häkkilä, Kalajoki (FI); Turo Keski-Jaskari, Vantaa (FI); Roope Takala, Helsinki (FI)

(73) Assignee: Nokia Corporation, Espoo (FI)

( * ) Notice: Subject to any disclaimer, the term of this patent is extended or adjusted under 35 U.S.C. 154(b) by 211 days.

(21) Appl. No.: 10/517,751

(22) PCT Filed: Jun. 12, 2003

(86) PCT No.: PCT/FI03/00470

§ 371 (c)(1),
(2), (4) Date: Dec. 13, 2004

(87) PCT Pub. No.: WO03/107168

PCT Pub. Date: Dec. 24, 2003

(65) Prior Publication Data

US 2005/0253816 A1    Nov. 17, 2005

(30) Foreign Application Priority Data

Jun. 14, 2002    (FI) ................................. 20021162

(51) Int. Cl.
*H03M 11/00* (2006.01)
(52) U.S. Cl. ............................. 341/22; 341/27; 341/24; 340/407.2; 345/173
(58) Field of Classification Search ........ 345/168–178; 341/22–34; 455/400–466; 379/433.07
See application file for complete search history.

(56) References Cited

U.S. PATENT DOCUMENTS

| | | | | |
|---|---|---|---|---|
| 5,748,512 A | * | 5/1998 | Vargas | 708/142 |
| 5,963,671 A | | 10/1999 | Comerford et al. | |
| 5,977,867 A | * | 11/1999 | Blouin | 340/407.2 |
| 6,259,436 B1 | * | 7/2001 | Moon et al. | 345/173 |
| 6,459,364 B1 | * | 10/2002 | Gupta | 340/407.1 |
| 6,703,924 B1 | * | 3/2004 | Tecu et al. | 340/407.1 |

FOREIGN PATENT DOCUMENTS

| | | |
|---|---|---|
| DE | 10012671 | 9/2001 |
| EP | 0 967 542 A2 | 12/1999 |
| EP | 1 168 233 A2 | 1/2002 |
| FR | 2806491 | 9/2001 |

\* cited by examiner

*Primary Examiner*—Jeffery Hofsass
*Assistant Examiner*—Hoi C. Lau
(74) *Attorney, Agent, or Firm*—Hollingsworth & Funk, LLC

(57) ABSTRACT

The invention relates to an electronic device and a method of managing a virtual keyboard of the electronic device. The device comprises a touch pad (106), a processing unit (600) and a feedback unit (612), which provides tactile feedback unit (612) for the user. The processing unit (600) is configured to determine a virtual keyboard (104) for the touch pad (106) and a tactile appearance of the keyboard (104), receive information generated by the pressing of a keyboard (104) key and identify the key that was pressed on the basis of the information. The processing unit (600) is further configured to collect information on the key presses and carry out an analysis of them, and re-determine the tactile appearance of the keyboard (104) on the basis of the collected information and the analysis carried out so as to make the keyboard more ergonomic for the user, which makes it easier to use the keyboard (104) and/or the pressing of a wrong key less likely.

36 Claims, 3 Drawing Sheets

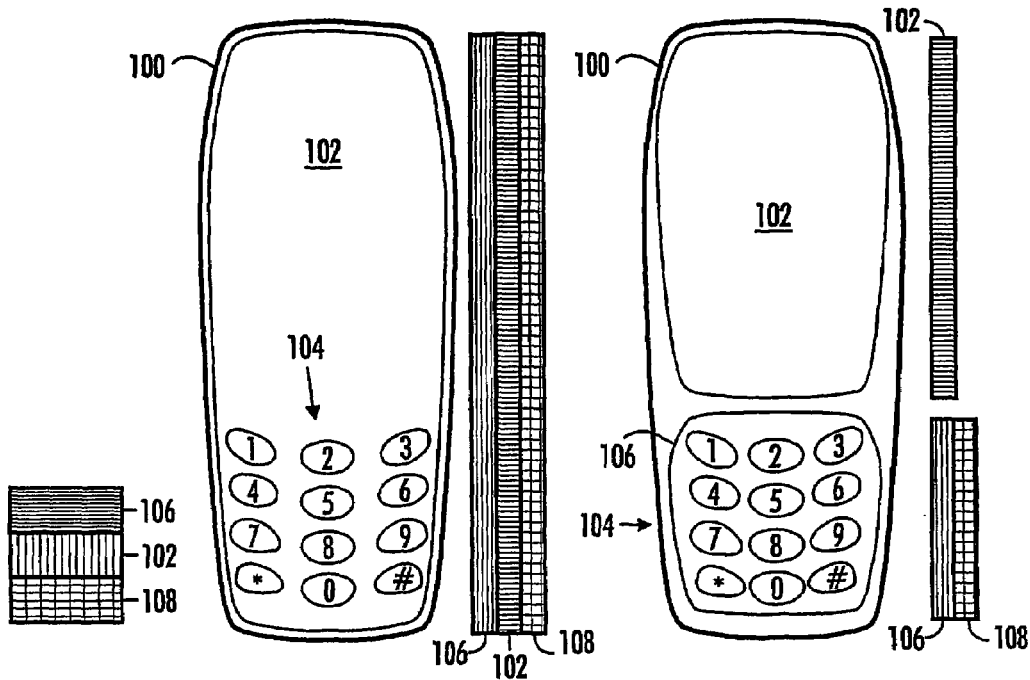
FIG. 1A  FIG. 1B  FIG. 1C
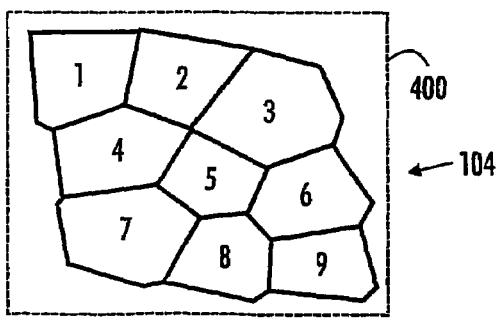
FIG. 2
FIG. 3
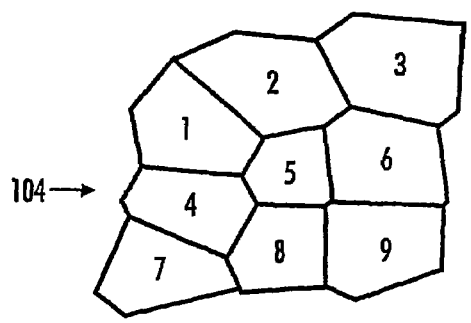
FIG. 4
FIG. 5

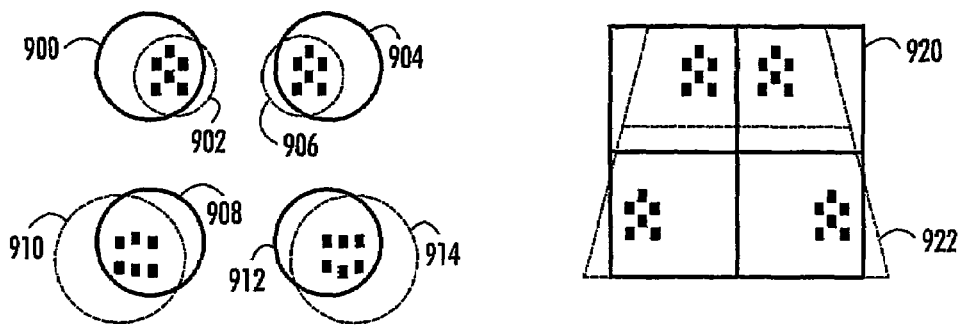
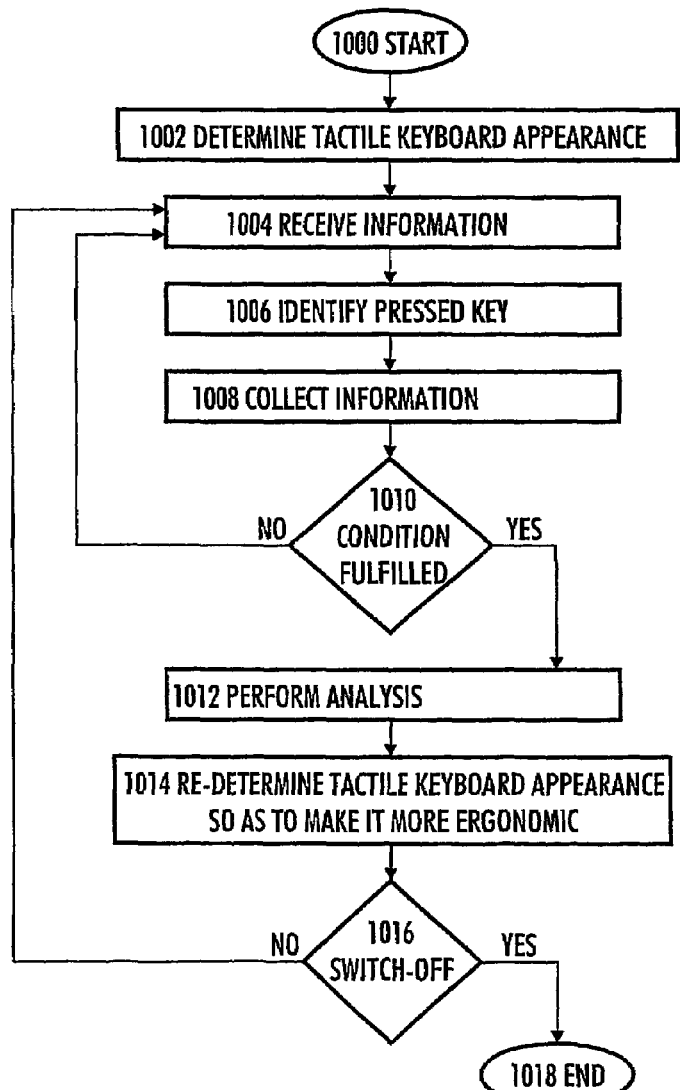
FIG. 9
FIG. 10

ELECTRONIC DEVICE AND METHOD OF MANAGING ITS KEYBOARD

FIELD

The invention relates to an electronic device and to a method of managing the virtual keyboard of the electronic device.

BACKGROUND

Electronic devices, e.g. portable subscriber terminals of a mobile communication system, usually include a keyboard. The keyboard can be implemented as a virtual keyboard using a touch pad, for example. The touch pad may also be provided with a display; this solution is known as a touch screen. The use of a virtual keyboard is facilitated by providing the user with tactile feedback on its use. As the devices are made smaller, the size of the virtual keyboard can also be decreased. When pressing keyboard keys, the user may also press wrong keys. The small key size may increase the occurrences of wrong key presses. The dimensions of users' hands are different and the ways in which the keys are pressed also vary: some use the thumb whereas the others use the index finger. Thus the tactile appearance of the keyboard is usually always a compromise; it suits an average user fine but has not been designed in accordance with the needs and routines of any individual user. As the use of different electronic devices provided with a keyboard is constantly becoming more common, there is a great need to enhance the ergonomics of keyboards.

BRIEF DESCRIPTION

The object of the invention is to provide an improved electronic device and an improved method of managing the virtual keyboard of the electronic device.

One aspect of the invention relates to an electronic device, comprising a touch pad, a processing unit connected to the touch pad over a data transmission connection, the processing unit being configured to determine a virtual keyboard on the touch pad and a tactile appearance of the touch pad, receive information generated by the pressing of a keyboard key and identify the key that was pressed on the basis of the information, and a feedback unit connected to the processing unit over a data transmission connection, the feedback unit being configured to provide tactile feedback on the keyboard use for the device user. The processing unit is further configured to collect information on key presses and carry out an analysis of them, and re-determine the tactile appearance of the keyboard on the basis of the collected information and the analysis carried out so as to make the keyboard more ergonomic for the user, which makes the use of the keyboard easier and/or the pressing of a wrong key less likely.

One aspect of the invention relates to a method of managing the virtual keyboard of an electronic device, the method comprising: determining a tactile appearance of the virtual keyboard; receiving information generated by the pressing of a keyboard key, and identifying the key that was pressed using the information. The method further comprises: collecting information on the key presses and carrying out an analysis of them; and re-determining the tactile appearance of the keyboard on the basis of the collected information and the analysis carried out so as to make the keyboard more ergonomic for the user, which makes the use of the keyboard easier and/or the pressing of a wrong key less likely.

The preferred embodiments of the invention are disclosed in the dependent claims.

The invention is based on the idea that the electronic device automatically analyzes how successfully the keyboard is used. On the basis of the analysis, the tactile appearance of the keyboard is tailored to meet the user's needs and routines better.

The device and the method of the invention provide several advantages. A personal keyboard can be implemented for each user with relatively little computation. The usability of small keyboards, in particular, can be improved. The method described can also be utilized in the product development phase, where the tactile keyboard appearance can be designed as ergonomic as possible for a large number of people on the basis of empirical tests carried out on the users.

LIST OF FIGURES

The invention will now be described in greater detail by means of preferred embodiments, with reference to the accompanying drawings, where FIGS. 1A, 1B and 1C illustrate implementation of a virtual keyboard and examples of the appearance of an electronic device provided with a keyboard, FIGS. 2, 3, 4, and 5 illustrate tests carried out by the applicant;

FIG. 9 illustrates some principles according to which the tactile keyboard appearance can be re-determined; and FIG. 10 is a flow chart illustrating a method of managing the keyboard of the electronic device.

DESCRIPTION OF THE EMBODIMENTS

Figure 6:
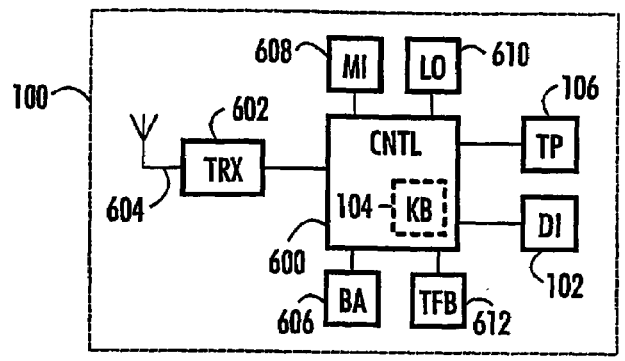
FIG. 6 is a simplified block diagram of the structure of an electronic device.

The electronic device may be, for example, a portable device for ubiquitous data processing, such as a subscriber terminal of a radio system, e.g. mobile communication system, a PDA device (Personal Digital Assistant) or another device, e.g. an electronic measurement device where the user interface comprises a keyboard. The device may also combine different functions, i.e. it may be a combination of a subscriber terminal and a PDA device, for example. An example of this kind of combined device is the Nokia® Communicator®.

The electronic device comprises a virtual keyboard, which provides tactile feedback and can be formed using the structure shown in FIG. 1A, for example. The topmost part is a touch pad 106, below which there may be a display, and the lowest part is a feedback unit 108, which provides tactile feedback. U.S. Pat. No. 5,977,867, U.S. 2003/0038776 and WO 03/038800, which are incorporated herein by reference, describe various solutions for giving tactile feedback. The solutions described can be used, where applicable, in connection with the structure described in FIG. 1A. The touch pad 106 can be implemented by prior art solutions, which may be based on capacitive or resistive sensors. When the user touches the touch pad 106 with his finger, for example, the touched point and usually also the touch force can be determined. The display 102 can be implemented by prior art solutions; for example, if the display should be flat, a liquid crystal display (LCD), plasma display or thin film transistor display (TFT) can be used. The feedback unit 108 providing tactile feedback can be implemented by prior art solutions, for example by a piezo-electric element or a linear vibrator based on a solenoid. The feedback unit 108 generates a mechanical movement, which the user can sense through touch. The frequency, amplitude and duration of the movement can be controlled. The movement can be sensed as trembling and vibration. The movement can simulate the click generated by a key press, for example. In the most complex case, the tactile feedback can imitate the texture of a surface. The home page of a company producing piezo-electric elements is found at www.americanpiezo.com. This manufacturer calls these piezoelectric elements 'disc benders'.

FIGS. 1B and 1C illustrate a front view of the device appearance and a side view of how the components shown in FIG. 1A are located in principle. In the example of FIG. 1B, the device 100 is a subscriber terminal of a radio system, which is provided with a display 102. In FIG. 1A, the display 102 is a touch screen on which a keyboard 104 has been generated. In our example the keyboard comprises twelve keys, i.e. "1", "2", "3", "4", "5", "6", "7", "8", "9", "0", "*" and "#". As described, the display 102 is provided with a touch pad 106 and a feedback unit 102. FIG. 1C illustrates a subscriber terminal 100, which comprises a display 102 and a touch pad 106, on which a virtual keyboard has been formed. As described, the image 104 of the keyboard, i.e. the contours of single keys, can be printed on the surface of the touch pad 106 during its manufacture, but this is not necessary. As described, the display 102 may be a separate part, and the touch pad 106 and the feedback unit 108 are in connection with each other.

Next, the structure of the electronic device will be described with reference to FIG. 6. Since we use a subscriber terminal as an example, the device 100 comprises an antenna 604 and a radio transceiver 602. The radio transceiver 602 is e.g. a prior art transceiver of a mobile station which functions in the GSM system (Global System for Mobile Communications), GPRS system (General Packet Radio Service) or in the UMTS system (Universal Mobile Telecommunications System), for instance. In addition to the above-mentioned virtual keyboard 104, display 102, touch pad 106 and feedback unit 108 for implementing the user interface, a typical device 100 comprises a microphone 608 and a loudspeaker 610 for processing sound. A chargeable battery 606 usually functions as the power source.

The device 100 further comprises a processing unit 600, which controls and monitors the operation of the device and its various parts. The processing unit 600 also includes the application programs of the device 100, e.g. for radio signal processing and user interface management. Nowadays the processing unit 600 is usually implemented as a processor and its software but various hardware solutions are also feasible, such as a circuit built from separate logic components or one or more application-specific integrated circuits (ASIC). If necessary, there may be more than one processor. A hybrid of these solutions is also feasible. In the selection of the implementation method a person skilled in the art will naturally consider the requirements set on the size and power consumption of the device, the necessary processing capacity, production costs and production volumes.

An electronic device 100 comprising a touch pad 106, a processing unit 600 connected to the touch pad 106 over a data transmission connection and a feedback unit 612 connected to the processing unit 600 over a data transmission connection was described above. The processing unit 600 is configured to determine a virtual keyboard 104 for the touch pad 106 and a tactile appearance of the keyboard 104. The feedback unit 612 is configured to give tactile feedback on the use of the keyboard 104 to the device user.

To manage the keyboard 104, the processing unit 600 is configured to receive information generated by the pressing of a keyboard 104 key and to identify the key that was pressed on the basis of the information. The touch pad 106 usually gives information on the point where the screen was pressed, e.g. as x and y coordinates, and also on the force by which the key was pressed. Other control data may also be transmitted to the processing unit 600 from the touch pad 106.

The processing unit 600 is further configured to collect the above-mentioned information on the key presses and to carry out an analysis of them. The analysis is used to generate at least one of the following results: coordinates of an accepted key press, coordinates of a rejected key press, coordinates of a corrected key press, time used for successive key presses, mean of the coordinates of the presses of one key, variance of the coordinates of the presses of one key, another statistical variable describing the presses of one key. The coordinates may refer to coordinates that define the pressed point with a desired accuracy, e.g. the centre point of a press or the touched area defined by the borderlines of a press. The statistical variable refers to other feasible ways of determining statistics for a key press, e.g. the median or the average size of the touched area, expressed as the width and height or the radius. The touched area can also be defined as an elliptical area where the touched area is defined by the centre point and main axes of the ellipse. The processing unit 600 can be configured to identify a press at the border of two keys or outside the keyboard 104 as a rejected key press. In addition, the processing unit 600 may be configured to identify the following sequence as a corrected key press: the first key press is deleted by the delete key, after which another key is pressed.

Then, on the basis of the collected information and the analysis carried out, the processing unit 600 re-determines the tactile appearance of the keyboard 104 so as to make the keyboard 104 more ergonomic for the user, which makes the use of the keyboard 104 easier and/or the pressing of a wrong key less likely. The tactile keyboard 104 appearance comprises at least one of the following: key size, key shape and key location. The key shape can also be defined as the key position; for example, if the key is implemented as an ellipse, the key position is determined as the directions of the ellipse's main axes. Thus the key shape can be adjusted by rotating the ellipse that defines it. Depending on the physical dimensions of the device 100, the processing unit 600 is configured to define limits for the keyboard 104 appearance that it cannot exceed.

Figure 8:
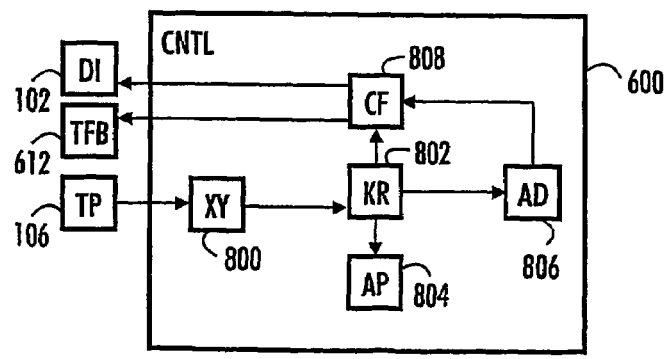
FIG. 8 illustrates the structure of a processing unit of the electronic device.

FIG. 8 illustrates a feasible structure of the processing unit 600. The blocks belonging to the processing unit 600 are structural entities that can be implemented e.g. as program modules, i.e. by a programming language, such as the C programming language, C++ programming language, computer language, or by an assembler, which are stored as runnable versions in a memory provided in the processor and run on the processor. Instead of translatable programming languages, other interpretable programming languages may naturally also be used, provided that they satisfy the required processing rate and capacity. When the processing unit 600 is implemented as an ASIC, the structural entities are ASIC blocks. Information is transmitted from the touch pad 106 to the processing unit 600. If the information is not in the form of x and y coordinates, it can be converted into this form by block 800. Block 800 may naturally also be provided in connection with the touch pad 106, e.g. in connection with the touch screen 102 when the touch screen technique is used. The processed information, which is presented e.g. as x and y coordinates, is then supplied to block 802, where the pressed key is identified. The information on the identified key is supplied to the application 804 that needs this information. The information on the identified key is also supplied to block 806, which collects information and carries out an analysis on the basis of which the tactile appearance of the keyboard 104 is changed. The definitions of the new tactile keyboard 104 appearance are then supplied from block 806 to block 808, which controls the determination of the keyboard 104 appearance. The whole block 808 or part of it may be located in connection with the touch pad 106, e.g. in connection with the touch screen 102 when the touch screen technology is employed. As can be seen from FIG. 8, there is also a connection from block 802 to block 808: tactile feedback on the keyboard use is given from the feedback unit 612, which is provided with a connection to block 808.

In an embodiment, the processing unit 600 is configured to determine the visual appearance of the keyboard 104 in addition to its tactile appearance. In that case, the visual appearance of the keyboard 104 is re-determined on the basis of the collected information and the analysis carried out so as to make the keyboard 104 more ergonomic for the user, which makes the use of the keyboard 104 easier and/or the pressing of a wrong key less likely. The determination of visual appearance is described in Finnish application 20021162, which is incorporated herein by reference. In the structure shown in FIG. 8, the visual appearance can be determined in block 808, which is provided with a connection to the display 102. In an embodiment, the processing unit 600 is configured to determine the tactile appearance of the keyboard 104 and the visual appearance of the keyboard 104 so that they correspond to each other.

There are several alternatives for changing the shape of a single key; for example, the key shape is changed in the main directions, i.e. in the x and y directions, or the key shape is changed arbitrarily, i.e. the key is shaped to correspond best to the manner of pressing the key, or the predetermined appearance of the key (e.g. preliminary shape and location of the key) is changed adaptively within the set limits. The processing unit 600 may be configured to move the centre point of a key according to the mean of the coordinates of key presses. The processing unit may be configured to change the key shape according to the variance of the coordinates of key presses. Some ways of changing the key shape will be discussed in greater detail below but at least the following clustering techniques can be used for changing the key shape: vector quantization VQ and expectation maximization EM. Also, other suitable adaptive and/or optimizing methods can be applied to changing the key shape.

In the following, tests carried out by the applicant on the new adaptive keyboard 104 will be described with reference to FIGS. 2, 3, 4 and 5. A portable computer provided with a touch screen was used in the test. A keyboard 104 illustrated in FIG. 2 was created both on the left and on the right side of the touch screen. Thus the keyboard appearance consisted of adjacent rectangular keys: "1", "2", "3", "4", "5", "6", "7", "8", and "9". The keybord 104 on the left side of the touch screen was used to simulate a situation where the user of the subscriber terminal 100 presses the keys with his left-hand thumb, and the keyboard 104 on the right side was correspondingly used to simulate a situation where the user of the subscriber terminal 100 presses the keys with his right-hand thumb.

Each key "1" to "9" was parameterized as shown in FIG. 3 by using its centre point 320, 322, 324, 326, 328, 330, 334, 336. The borderlines 300, 302, 304, 306, 308, 310, 312, 314 between the keys were defined implicitly using the Voronoi regions of the centre points known from vector quantization. For example, the Voronoi region of key "1" is the rectangular area which is defined by borderlines 300, 302, 308 and 319 and is closer to the centre point 320 of key "1" than to any other centre point. Principles of vector quantization and computing of Voronoi regions are described in Allen Gersho & Robert M. Gray: Vector Quantization and Signal Compression, The Kluwer International Series in Engineering and Computer Science, 1992, which is incorporated herein by reference. In addition to the nine adaptive centre points 320, 322, 324, 326, 328, 330, 332, 334, 336 of the keys, sixteen fixed centre points 340, 342, 344, 346, 348, 350, 352, 354, 356, 358, 360, 363, 364, 366, 368, 370 were determined. These were associated with the value 'nil' or with the keyboard 104 border. The Voronoi regions of these fixed centre points were defined as regions outside the keyboard 104 border.

Then the actual test started. The test was carried out first on the keyboard 104 on the left side and then on the keyboard on the right side. A sequence consisting of four random numbers R1, R2, R3, R4 was shown to the user (on the touch screen). The random numbers were selected from 1 to 9. The user tried to key in these numbers using the keyboard 104 to be tested with his respective thumb. The feeding thus took place by pressing the keyboard 104 key in question, i.e. the Voronoi region of the code book vector associated with the key concerned.

The real coordinates P1=(x1, y1), P2=(x2, y2), P3=(x3, y3) and P4=(x4, y4) of each key press were saved. Each press Pi was associated with the index (i.e. key "1" to "9") of the code book vector C(1) to C(9) that was closest to the press. Thus we obtained an input sequence of I1, I2, I3, I4.

If Ii was the same as number Ri, the press Pi coordinates (xi, yi) were saved in the set L(Ri) of accepted key presses for the key C(Ri) in question. If Ii was associated with a key different from number Ri, it was rejected.

After an adequate sample of key presses had been collected, e.g. hundred sequences consisting of four numbers, new code book vectors C(1) to C(9) were calculated for keys "1" to "9". The new code book vector was determined as the mean of the coordinates of the key in question in the set L(1)–L(9) of the coordinates of the presses of this key. After this, a keyboard 104 whose appearance had been re-determined to make it more ergonomic for the keyboard 104 user was shown to the user.

FIG. 4 shows the appearance of the keyboard 104 re-determined for the left-hand thumb, and FIG. 5 shows the appearance of the keyboard 104 re-determined for the right-hand thumb. In FIG. 4, the area 400 marked with dash lines describes the fact that limits (e.g. the maximum size) can be defined for the appearance of the keyboard 104 which the keyboard 104 appearance cannot exceed. The appearances of the keyboards 104 are symmetrical to each other to some extent, and thus it can be assumed that it has been determined ergonomically to support the function of the testee's thumbs. Even though the visual appearance of a virtual keyboard 104 was determined in the tests, the method and results described are also directly applicable to the re-determination of the tactile appearance of a virtual keyboard 104.

Figure 7A:
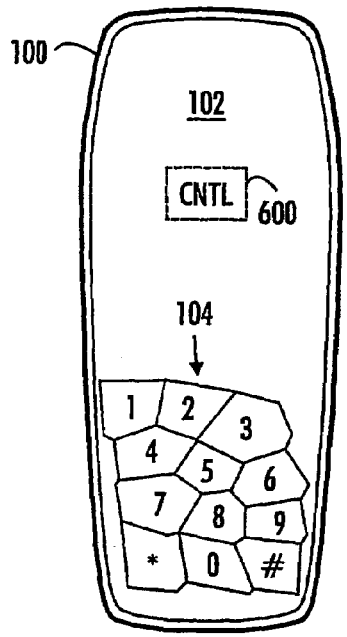
FIGS. 7A and 7B illustrate the devices of FIGS. 1B and 1C after the tactile appearance of their keyboards has been made more ergonomic.
Figure 7B:
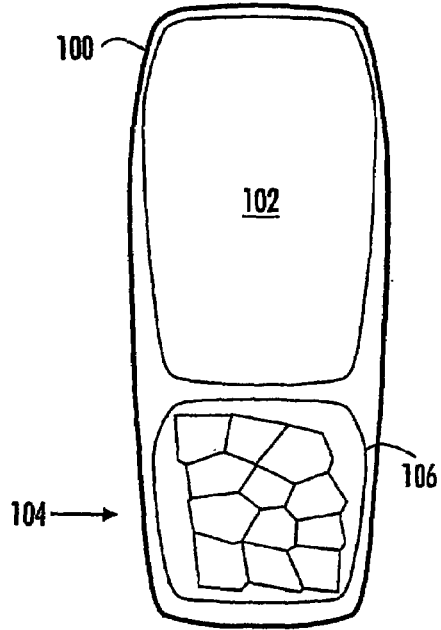

FIGS. 7A and 7B illustrate what the keyboard of the subscriber terminals 100 shown in FIGS. 1B and 1C could look like after its tactile appearance has been made more ergonomic using the present method. The appearance of keys "*", "0" and "#" is an estimate, but that of the other keys is based on the test described above. If the electronic device 100 is used by more than one person, the device may comprise an alternative for each person. Thus the device 100 can determine, employing the method described, a separate keyboard 104 for each user that best suits his ergonomics. The present method can also be used in the product development phase, in which case the keyboard 104 appearance can be designed as ergonomic as possible for a large number of people on the basis of the tests described above.

There are numerous alternatives for the tactile appearance of a virtual keyboard 104. In an embodiment, the processing unit 600 is configured to determine the tactile keyboard 104 appearance by giving a first tactile feedback on a key pressing. The first tactile feedback may imitate the click generated by the pressing of a normal electromechanical key, for example. In an embodiment, the processing unit 600 is configured to determine several first tactile feedbacks, a separate one either for each key or for each key group. In an embodiment, the processing unit 600 is configured to determine the tactile keyboard 104 appearance by giving a second tactile feedback on the key when it is not pressed. The second feedback may be weak vibration, for example. In an embodiment, the processing unit 600 is configured to determine the tactile keyboard 104 appearance by giving a third tactile feedback on an area which is outside the keys but belongs to the tactile keyboard 104 appearance. When the user touches the touch pad described in FIG. 7B, for example, but none of the keys belonging to the virtual keyboard 104, a third feedback is given. In its simplest, the third tactile feedback can be determined to correspond to a situation where no feedback is given from the feedback unit 612.

FIG. 9 illustrates some principles according to which the keyboard 104 appearance can be re-determined. On the left side of FIG. 9 there are four keys 900, 904, 908, 912. The points describe the coordinates of key presses. The dash line denotes the location and size of new keys 902, 906, 910, 914. As can be seen, the location of the keys has been changed so that the centre point of the key corresponds better to the centre point of the presses. The size of the keys has been changed considering the variance of key presses. In this example, a condition has been set on the appearance of the keys: the key has to be circular. The variance of the presses of the upper keys 900, 904 is smaller than the variance of the presses of the lower keys 908, 912, and thus the size of the new upper keys 902, 906 has been reduced from their original size, whereas the size of the new lower keys 910, 914 has been increased from their original size. The right side of FIG. 9 illustrates one way of implementing vector quantization where key presses denoted by dots are considered data clusters. The appearance of the original keyboard 920 consisting of four rectangles has been changed, using vector quantization, into new kind of keyboard 922 consisting of four areas which are no longer rectangles.

In the following, a method of managing the virtual keyboard of an electronic device will be described with reference to FIG. 10. The method starts in 1000, e.g. when the device is switched on. Then the tactile keyboard appearance is determined in 1002. The embodiments described above in connection with the device can be used in determining the tactile appearance. After the keyboard has been determined, the user may start using it. When the user uses the keyboard, information generated by pressing of the keyboard keys is received in 1004 and in 1006 the key that was pressed is identified on the basis of the information. Then we proceed to 1008, where information is collected on the use of the keyboard. The information comprises at least one of the following: key press coordinates, keyboard control data, and force of the key press.

According to the method, the tactile appearance of the virtual keyboard is not necessarily re-determined constantly but e.g. at certain intervals, when the device recognizes a new user, or when the user makes a selection according to which the device re-determines the appearance. The method may comprise testing, in accordance with 1010, whether a condition for re-determining the tactile keyboard appearance is fulfilled. If the condition is not fulfilled in 1010, we move to 1004, otherwise to 1012, where the key presses are analyzed.

The analysis is used to generate at least one of the following results: coordinates of an accepted key press, coordinates of a rejected key press, coordinates of a corrected key press, time used for successive key presses, mean of the coordinates of the presses of one key, variance of the coordinates of the presses of one key, another statistical variable describing the presses of one key. A key press at the border of two keys or a key press outside the keyboard can be identified as a rejected press. A sequence where the press of the first key is deleted by the delete key, after which another key is pressed, can be identified as a corrected key press.

Naturally, the function of 1008 is not performed if one does not want to re-determine the tactile keyboard appearance. If, however, one wants to determine the appearance, the tactile keyboard appearance is re-determined in 1014 on the basis of the collected information and the analysis carried out so as to make the keyboard more ergonomic for the user, which makes the use of the keyboard easier and the pressing of a wrong key less likely. The tactile keyboard appearance comprises at least one of the following: key size, key shape and key location. Limits which the keyboard appearance may not exceed can be defined. The key shape may be changed in the main directions as described above, the key shape may be changed arbitrarily, the key centre point may be moved according to the mean of the coordinates of key presses, the key shape may be changed according to the variance of the coordinates of key presses, or the key shape is changed using vector quantization, expectation maximization or clustering. Other suitable adaptive and/or optimizing methods can also be applied to changing the key shape.

Switching off of the device can be tested in block 1016. If the device is switched off, we move to 1018, where the keyboard determined can be saved for the user in question, and thus the method ends. If the device is not switched off, we move from 1018 to 1004. Naturally, 1016 may be located at other points of the method sequence. An embodiment of the method employs the determination of the visual keyboard appearance described above. A device 100 described above is suitable for performing the method but also other devices where the keyboard shape can be changed may be applicable.

Even though the invention was described with reference to an example according to the accompanying drawings, it is clear that the invention is not restricted thereto but it may be modified in various ways within the inventive concept disclosed in the enclosed claims.

The invention claimed is:

1. An electronic device comprising
   a touch pad,
   a processing unit connected to the touch pad over a data transmission connection, the processing unit being configured to determine a virtual keyboard for the touch pad and a tactile appearance of the keyboard, receive information generated by the pressing of a keyboard key and identify the key that was pressed on the basis of the information, and
   a feedback unit connected to the processing unit over a data transmission connection, the feedback unit being configured to provide tactile feedback on the keyboard use for the device user,
   wherein the processing unit is further configured to collect information on the key presses and carry out an analysis of them, and reconfigure the tactile appearance of the keyboard on the basis of the collected information and the analysis carried out so as to make the keyboard more ergonomic for the user, which makes it easier to use the keyboard and/or the pressing of a wrong key less likely.

2. A device according to claim 1, wherein the information comprises at least one of the following: key press coordinates, keyboard control data and force of the key press.

3. A device according to claim 1, wherein the analysis is used to generate at least one of the following results: coordinates of an acceptable key press, coordinates of a rejected key press, coordinates of a corrected key press, time used for successive key presses, mean of the coordinates of presses of one key, variance of the presses of one key, another statistical variable describing the presses of one key.

4. A device according to claim 3, wherein the processing unit is configured to identify a press at the border of two keys or outside the keyboard as a rejected key press.

5. A device according to claim 3, wherein the processing unit is configured to identify the following sequence as a corrected key press: the first key press is deleted by the delete key, after which another key is pressed.

6. A device according to claim 1, wherein the tactile keyboard appearance comprises at least one of the following: key size, key shape and key location.

7. A device according to claim 1, wherein the processing unit is configured to define limits for the tactile keyboard appearance that the tactile keyboard appearance cannot exceed.

8. A device according to claim 6, wherein the processing unit is configured to change the key shape in the main directions.

9. A device according to claim 6, wherein the processing unit is configured to change the key shape arbitrarily.

10. A device according to claim 6, wherein the processing unit is configured to move the key centre point according to the mean of the coordinates of key presses.

11. A device according to claim 6, wherein the processing unit is configured to change the key shape according to the variance of the coordinates of key presses.

12. A device according to claim 6, wherein the processing unit is configured to change the key shape using vector quantization, expectation maximization, clustering or another suitable adaptive and/or optimizing method.

13. A device according to claim 1, wherein the processing unit is configured to determine the tactile keyboard appearance by giving a first tactile feedback on a key press.

14. A device according to claim 13, wherein the processing unit is configured to determine various first tactile feedbacks, a separate one either for each key or for each key group.

15. A device according to claim 1, wherein any one of the preceding claims, the processing unit is configured to determine the tactile keyboard appearance by giving a second tactile feedback on the key when it is not pressed.

16. A device according to claim 1, wherein the processing unit is configured to determine the tactile keyboard appearance by giving a third tactile feedback on an area which is outside the keys but belongs to the tactile keyboard appearance.

17. A device according to claim 1, wherein the processing unit is configured to determine the visual keyboard appearance and re-determine the visual keyboard appearance on the basis of the collected information and the analysis carried out so as to make the keyboard more ergonomic for the user, which makes it easier to use the keyboard and/or the pressing of a wrong key less likely.

18. A device according to claim 17, wherein the processing unit is configured to determine the tactile keyboard appearance and the visual keyboard appearance so that they correspond to each other.

19. A method of managing a virtual keyboard of an electronic device, the method comprising:
   determining a tactile appearance of the virtual keyboard; and
   receiving information generated by the pressing of a keyboard key and identifying the key pressed on the basis of the information;
   collecting information on the key presses and carrying out an analysis of them; and
   reconfigure the tactile appearance of the keyboard on the basis of the collected information and the analysis carried out so as to make the keyboard more ergonomic for the user, which makes the use of the keyboard easier and/or the pressing of a wrong key less likely.

20. A method according to claim 19, wherein the information comprises at least one of the following: key press coordinates, keyboard control data and force of the key press.

21. A method according to preceding claim 19, the method comprising using the analysis is used to generate at least one of the following results: coordinates of an accepted key press, coordinates of a rejected key press, coordinates of a corrected key press, time used for successive key presses, mean of the coordinates of the presses of one key, variance of the presses of one key, another statistical variable describing the presses of one key.

22. A method according to claim 21, further comprising identifying a press at the border of two keys or outside the keyboard as a rejected key press.

23. A method according to claim 21, further comprising identifying the following sequence as a corrected key press: the first key press is deleted by the delete key, after which another key is pressed.

24. A method according to claim 19, wherein the tactile keyboard appearance comprises at least one of the following: key size, key shape and key location.

25. A method according to claim 19, further comprising defining limits for the keyboard appearance that the keyboard appearance cannot exceed.

26. A method according to claim 24, further comprising changing the key shape in the main directions.

27. A method according to claim 24, further comprising changing the key shape arbitrarily.

28. A method according to claim 24, further comprising moving the key centre point according to the mean of the coordinates of key presses.

29. A method according to claim 24, further comprising changing the key shape according to the variance of the coordinates of key presses.

30. A method according to claim 24, further comprising changing the key shape using vector quantization, expectation maximization, clustering or another suitable adaptive and/or optimizing method.

31. A method according to claim 19, further comprising determining the tactile keyboard appearance by giving a first tactile feedback on a key press.

32. A device according to claim 31, further comprising determining various first feedbacks, a separate one either for each key or for each key group.

33. A method according to claim 19, further comprising determining the tactile keyboard appearance by giving a second tactile feedback on the key when it is not pressed.

34. A method according to claim 19, further comprising determining the tactile keyboard appearance by giving a third tactile feedback on an area which is outside the keys but belongs to the tactile keyboard appearance.

35. A method according to claim 19, further comprising determining the visual keyboard appearance and re-determining the visual keyboard appearance on the basis of the collected information and the analysis carried out so as to make the keyboard more ergonomic for the user, which makes it easier to use the keyboard and/or the pressing of a wrong key less likely.

36. A method according to claim 35, further comprising determining the tactile keyboard appearance and the visual keyboard appearance so that they correspond to each other.

* * * * *